United States Patent
Collette et al.

(10) Patent No.: US 6,217,818 B1
(45) Date of Patent: *Apr. 17, 2001

(54) METHOD OF MAKING PREFORM AND CONTAINER WITH CRYSTALLIZED NECK FINISH

(75) Inventors: Wayne N. Collette, Merrimack; Suppayan M. Krishnakumar, Nashua, both of NH (US)

(73) Assignee: Continental PET Technologies, Inc., Florence, KY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/534,126

(22) Filed: Sep. 26, 1995

Related U.S. Application Data

(63) Continuation-in-part of application No. 08/499,570, filed on Jul. 7, 1995, now abandoned.

(51) Int. Cl.[7] .................................................. B29C 45/16
(52) U.S. Cl. ......................... 264/513; 264/255; 264/265; 264/537; 264/328.8; 264/328.16; 264/908
(58) Field of Search ..................................... 264/255, 513, 264/908, 537, 328.1, 328.2, 328.7, 328.8, 328.14, 328.16, 265, 266

(56) References Cited

U.S. PATENT DOCUMENTS

| | | | |
|---|---|---|---|
| 3,086,249 | * 4/1963 | Nelson et al. ...................... 264/513 |
| 3,224,043 | 12/1965 | Lameris et al. . |
| 3,943,219 | 3/1976 | Aoki ...................................... 264/97 |
| 4,293,520 | * 10/1981 | Akutsu ................................. 264/513 |
| 4,307,137 | * 12/1981 | Ota et al. ............................. 264/513 |
| 4,330,257 | 5/1982 | Rees et al. ........................... 425/556 |
| 4,342,895 | 8/1982 | Krishnakumar et al. .......... 219/10.43 |
| 4,347,209 | 8/1982 | Suzuki ................................... 264/250 |
| 4,396,816 | 8/1983 | Krishnakumer et al. .......... 219/10.43 |
| 4,398,642 | 8/1983 | Okudaira et al. .................... 215/1 C |

(List continued on next page.)

FOREIGN PATENT DOCUMENTS

| | | |
|---|---|---|
| 0 302 117 A1 | 2/1989 | (EP) . |
| 0302117 A1 | 2/1989 | (EP) . |
| 2538297 | 6/1984 | (FR) . |
| 1482956 | 8/1977 | (GB) . |
| 2011309 | 7/1979 | (GB) . |
| 61-002519 | 5/1986 | (JP) . |
| 61-185417 | 8/1986 | (JP) . |
| 5-73568 | 10/1993 | (JP) . |
| WO 95/00325 | 1/1995 | (WO) . |
| WO 95/07219 | 3/1995 | (WO) . |
| WO 95/22451 | 8/1995 | (WO) . |

*Primary Examiner*—Angela Ortiz
(74) *Attorney, Agent, or Firm*—Wolf, Greenfield & Sacks, PC

(57) ABSTRACT

A preform and container each having a crystallized neck finish and method of making the same, wherein the method involves introducing a first thermoplastic material into a first mold section to form a substantially crystallized neck portion of a preform, and introducing a second thermoplastic material into a second mold section to form a substantially amorphous body-forming portion of a preform. The first material may have a substantially higher crystallization rate than the second material, and/or the first mold section may be at a higher temperature than the second mold section. In one embodiment, an indexer carrying two core sets is movable between first and second cavity sets for sequentially molding the neck portions on the first core set in the first cavity set, and then transferring the cores and neck portions to the second cavity set for molding the body-forming portions. The method enables cost-effective manufacture of preforms with crystallized neck finishes and enables production of a thermal resistant finish within a close dimensional tolerance.

27 Claims, 7 Drawing Sheets

U.S. PATENT DOCUMENTS

| | | |
|---|---|---|
| 4,407,651 | 10/1983 | Beck et al. ............................... 432/11 |
| 4,413,974 | 11/1983 | Kontz .................................. 425/523 |
| 4,449,913 | 5/1984 | Krishnakumar et al. ............ 425/548 |
| 4,476,364 | 10/1984 | Prevot et al. ..................... 219/10.81 |
| 4,507,258 | 3/1985 | Aoki .................................... 264/255 |
| 4,589,559 * | 5/1986 | Hayashi et al. ..................... 264/908 |
| 4,590,021 * | 5/1986 | Ota et al. ............................. 264/908 |
| 4,609,516 | 9/1986 | Krishnakumar et al. ............ 264/255 |
| 4,715,504 * | 12/1987 | Chang et al. ........................ 264/513 |
| 4,731,513 | 3/1988 | Collette ............................ 219/10.43 |
| 4,744,742 | 5/1988 | Aoki .................................. 425/126.1 |
| 4,786,455 | 11/1988 | Krishnakumar et al. ............ 264/237 |
| 4,830,811 | 5/1989 | Aoki .................................... 264/513 |
| 4,885,121 | 12/1989 | Patel .................................... 264/255 |
| 4,923,723 | 5/1990 | Collette et al. ..................... 428/35.7 |
| 4,933,135 * | 6/1990 | Horwege et al. .................... 264/521 |
| 5,030,406 | 7/1991 | Sorensen .............................. 264/255 |
| 5,032,341 | 7/1991 | Krishnakumar et al. ............ 264/255 |
| 5,034,177 * | 7/1991 | Niima et al. .................... 264/328.14 |
| 5,049,345 | 9/1991 | Collette et al. ...................... 264/255 |
| 5,141,695 | 8/1992 | Nakamura ........................... 264/255 |
| 5,221,507 | 6/1993 | Beck et al. .......................... 264/255 |
| 5,354,532 | 10/1994 | Nakai et al. ......................... 264/259 |
| 5,443,766 | 8/1995 | Slat et al. .............................. 264/37 |
| 5,447,766 | 9/1995 | Orimoto et al. .................. 428/36.91 |
| 5,599,598 | 2/1997 | Valyi .................................. 428/35.7 |
| 5,628,957 * | 5/1997 | Collette et al. ...................... 264/513 |

\* cited by examiner

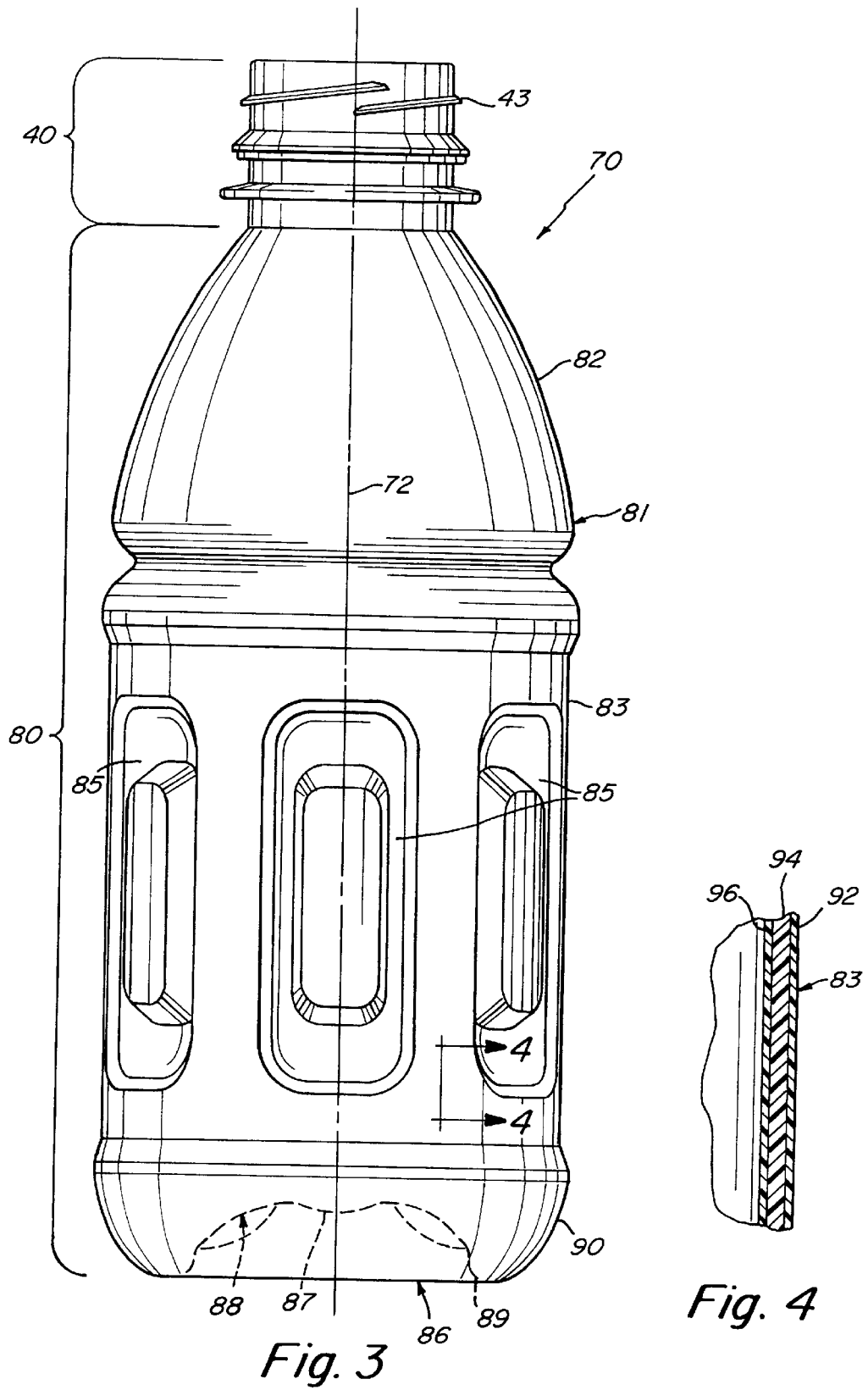

a container is very important and tightly controlled because of competitive pressures.

Alternative methods of strengthening the neck finish involve crystallizing select portions of the neck finish, such as the top sealing surface and flange. Again, this requires an additional heating step. Another alternative is to use a high $T_g$ material in one or more layers of the neck finish. Generally, this involves more complex preform injection molding procedures to achieve the necessary layered structure in the finish.

Thus, it would be desirable to provide a thermoplastic preform for a container having a neck finish which resists deformation, particularly at elevated temperatures, and a commercially acceptable method of manufacturing the same.

METHOD OF MAKING PREFORM AND CONTAINER WITH CRYSTALLIZED NECK FINISH

RELATED APPLICATIONS

This is a continuation-in-part of and commonly owned U.S. Ser. No. 08/499,570 filed Jul. 7, 1995, now abandoned, entitled APPARATUS AND METHOD FOR MAKING MULTILAYER PREFORMS," by Suppayan M. Krishnakumar and Wayne N. Collette, which is hereby incorporated by reference in its entirety.

FIELD OF THE INVENTION

The present invention relates to thermoplastic preforms, of the type used for blow molding polyester beverage bottles, and more particularly to preforms having a crystallized first portion (e.g., neck finish) for resistance to deformation at elevated temperatures.

BACKGROUND OF THE INVENTION

There are a variety of applications in which thermoplastic containers are subjected to elevated temperatures. These include hot-fill containers, which must withstand filling with a hot liquid product (for sterilization purposes) without deformation, followed by sealing and a cooling process which produces a vacuum (negative pressure) in the container. Another application is pasteurization—a pasteurizable container is filled and sealed at room temperature, and then exposed to an elevated temperature bath for about ten minutes or longer. The pasteurization process initially imposes high temperatures and positive internal pressures, followed by a cooling process which creates a vacuum in the container. Throughout these procedures, the sealed container must resist deformation so as to remain acceptable in appearance, within a designated volume tolerance, and without leakage. In particular, the threaded neck finish must resist deformation which would prevent a complete seal.

Another high-temperature application is use as a returnable and refillable carbonated beverage container, now commercialized in Europe, South America, and Asia. In this application the container must withstand twenty or more wash and reuse cycles in which it is filled with a carbonated beverage at an elevated pressure, sold to the consumer, returned empty, and washed in a hot caustic solution prior to refilling. These repeated cycles of exposure to hot caustic agents and filling at elevated pressures make it difficult to maintain the threaded neck finish within tolerances required to ensure a good seal.

A number of methods have been proposed for strengthening the neck finish portion of a container to resist deformation at elevated temperatures. One method is to add an additional manufacturing step whereby the neck finish of the preform or container is exposed to a heating element in order to thermally crystallize the neck finish. However, there are several problems with this approach. First, during crystallization the polymer density increases, which produces a volume decrease. Therefore, in order to obtain a desired neck finish dimension, the as-molded dimension must be larger than the final crystallized dimension. It is difficult to achieve close dimensional tolerances with this method. In general, the variability of the critical neck finish dimensions after crystallization are approximately twice that prior to crystallization. Secondly, there is the increased cost of the additional processing step which requires both time and the application of energy (heat). The overall cost of producing

SUMMARY OF THE INVENTION

The present invention is directed to a method for making a preform with a crystallized first portion (e.g., neck finish) and an amorphous second portion (e.g., body-forming portion). The method is both cost effective and can provide a thermal-resistant neck finish within a given dimensional tolerance.

In one embodiment, a method of making the preform is provided wherein a first thermoplastic material is introduced into a first mold section to form a crystallized neck portion of a preform, and a second thermoplastic material having a relatively low crystallization rate compared to the first material is introduced into a second mold section to form a substantially amorphous body-forming portion of the preform. By achieving crystallization in the neck finish during the molding step, the initial and final finish dimensions are the same so that dimensional variations are minimized. Also, a higher average level of crystallization in the finish can be achieved by utilizing the higher melt temperatures and/or elevated pressures of the molding process. Furthermore, by crystallizing during the molding step, the prior art step of post-mold thermal crystallization can be eliminated.

Another aspect of the invention provides a method and apparatus for the cost-effective manufacture of such preforms. In one embodiment, the apparatus includes an indexer (e.g., rotary or oscilliatory) with two faces, each face having a set of preform molding cores. The cores on the two faces are simultaneously positionable in two different sets of preform molding cavities. In a first set of cavities (first molding station), a crystallized neck portion is being formed on one set of cores, while in the other set of cavities (second molding station) a plurality of amorphous body-forming portions are being formed on the other set of cores. By simultaneously molding in two sets of cavities, an efficient process is provided. By molding the neck and body20456.1 forming portions separately in different cavities, different temperatures and/or pressures may be used to obtain different molding conditions and different properties in the two preform portions. For example, it is possible to render the neck portion opaque by thermally crystallizing the neck portion in the first set of cavities, while maintaining the body-forming portion substantially amorphous in the second set of cavities.

Various thermoplastic polymers can be used to form the neck and body-forming portions, and the processing conditions will vary depending on the specific application. In one embodiment, a hot-fillable polyester container is made having a crystallized neck portion of CPET, a terephthalic polyester with nucleating agents which render the polymer rapidly crystallizable during injection molding. The body-forming portion is a two-material, three-layer (2M, 3L) structure, including inner and outer layers of virgin polyethylene terephthalate (PET), and a core layer of for example post-consumer PET (PC-PET). Numerous alternative high glass transition ($T_g$) polymers may be used in place of CPET, such as arylate polymers, polyethylene naphthalate (PEN) homopolymers, copolymers or blends, polycarbonates, etc. As for the body-forming portion, numerous alternative polymers and layer structures are possible, incorporating PEN, ethylene/vinyl alcohol (EVOH) or MXD-6 nylon barrier layers, oxygen scavenging polymers, etc.

The present invention will be more particularly set forth in the following detailed description and accompanying drawings.

BRIEF DESCRIPTION OF THE FIGURES

FIGS. 1A–1B are schematic illustrations of an indexed injection molding apparatus and the sequence of operation according to one method embodiment of the present invention, wherein FIG. 1A shows two sets of mold cavities and cores in a first closed position, and FIG. 1B shows the cavities/cores in a second open position.

FIG. 3 is a front elevational view of a hot-fill container, made from the preform of FIG. 2.

FIG. 4 is an enlarged fragmentary cross-section of the container sidewall taken along line 4—4 of FIG. 3.

DETAILED DESCRIPTION

First Method Embodiment (Indexer)

Figure 1A:
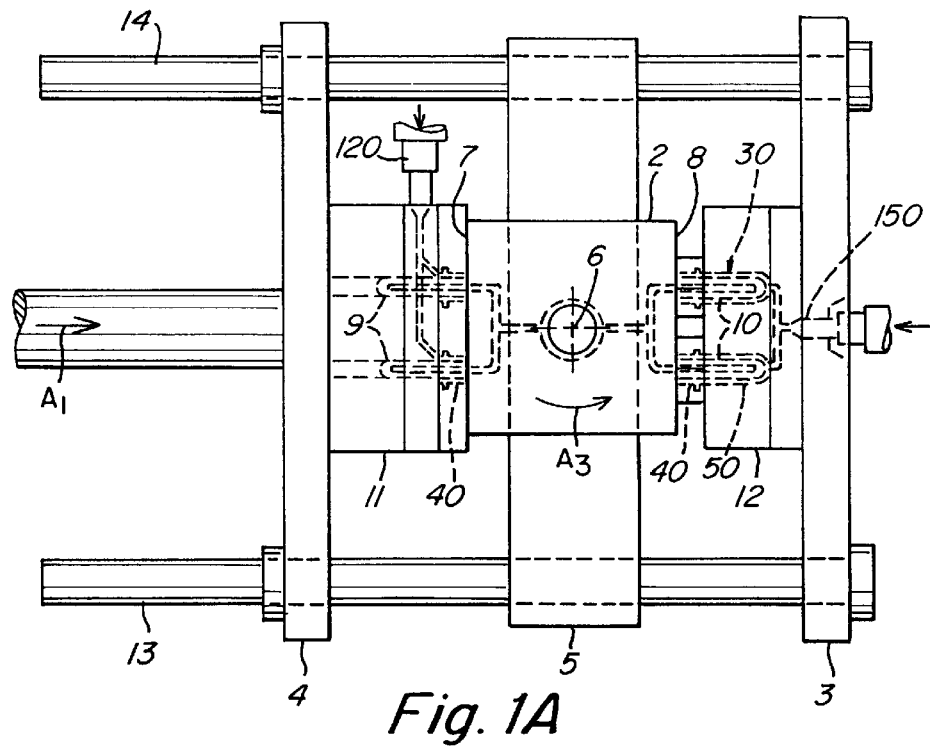
Figure 1B:
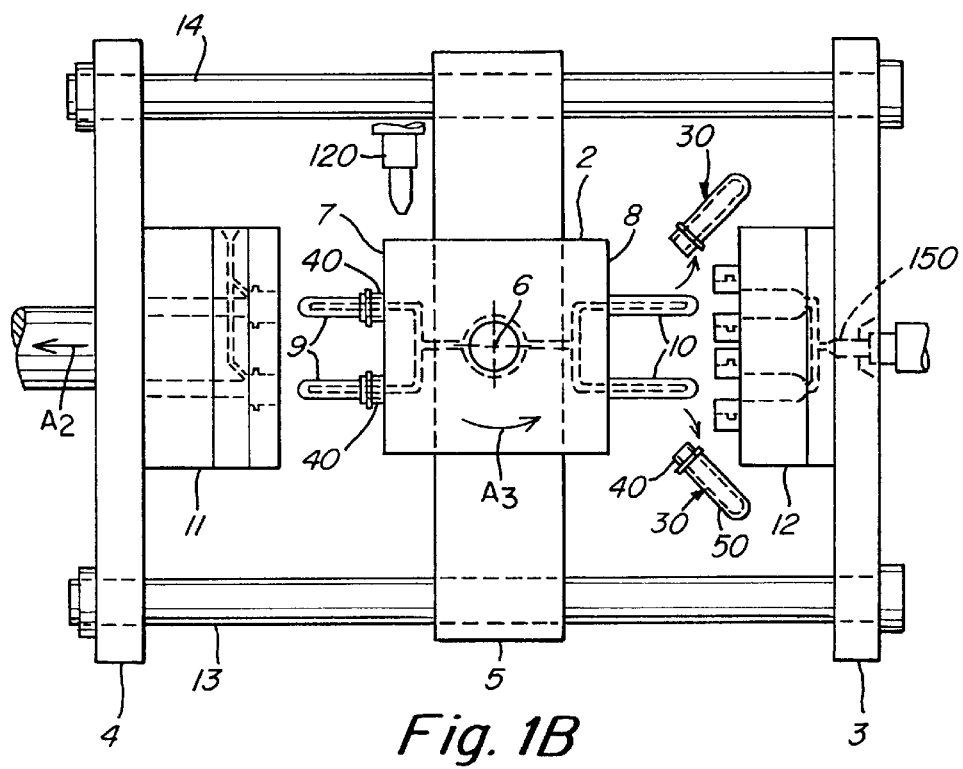

FIGS. 1A and 1B illustrate schematically one embodiment of a two-stage injection molding apparatus and method of the present invention. A four-sided indexer 2 is interposed between a fixed 3 and a movable 4 platen on an injection molding machine. The indexer 2 is mounted on a carriage 5 which is slidable in the direction of platen motion (shown by arrows $A_1$ and $A_2$). The indexer 2 is rotatable (shown by arrow $A_3$) about an axis 6 disposed perpendicular to the direction of platen motion. The indexer is rotatable into two operative positions spaced 180° apart. In each of these positions, the two opposing faces 7, 8 of the indexer carrying first and second sets of cores 9, 10 respectively, are received in a first set of cavities 11 on the movable platen 4, and a second set of cavities 12 on the fixed platen 3. After a core set has been successively positioned in each of the mold cavities, the finished preforms may be ejected from the cores. Each of the core sets 9, 10 include water passages 15 for heating or cooling of the cores to achieve a desired temperature during molding.

The sequence of operation is as follows. In FIG. 1A, the movable platen 4 carrying the first set of mold cavities 11, and the carriage 5 carrying the indexer 2, are each moved on guide bars (tie rods) 13, 14 to the left towards the fixed platen 3 to close the mold (i.e., both cavities). The first set of cores 9 on the left face 7 of the indexer are positioned in the first cavity set 11 (first molding station) alternatively configured for heating or cooling; each first core/cavity pair defines an enclosed chamber for molding a neck portion 40 about the first core 9. A first polymer material having a relatively high rate of crystallization is injected via nozzle 120 into the first mold cavities to form the neck portions. Simultaneously, the second core set 10 on the second face 8 of the indexer is positioned in the second cavity set 12 (second molding station), which is water cooled. Multiple polymer materials having a relatively low rate of crystallization are simultaneously or sequentially injected via nozzle 150 into the second set of cavities to form multilayer transparent body-forming portions 50 (below previously molded neck portions) on the second set of cores.

Next, the mold is opened as shown in FIG. 1B by moving both the movable platen 4 and carriage 5 to the left, whereby the first cores 9 are removed from the first cavities 11 and the second cores 10 are removed from the second cavities 12. Now, the finished preforms 30 on the second core set are ejected. The finished preforms 30 may be ejected into a set of robot-actuated cooling tubes (not shown) as is well known in the art. Next, the indexer 2 is rotated 180°, whereby the first set of cores 9 with the neck portions 40 thereon are moved to the right side (ready for insertion into the second set of cavities 12), and the second set of (now empty) cores 10 is moved to the left side (ready for insertion into the first set of mold cavities 11). Again, the mold is closed as shown in FIG. 1A and injection of the polymer materials into the first and second sets of cavities proceeds as previously described.

A suitable injection molding apparatus for use at the second molding station 12 of FIG. 1, i.e., a metered, sequential co-injection apparatus for forming the multiple layers of the preform body-forming portion 50, is described in U.S. Pat. No. 4,710,118 to Krishnakumar et al. granted Dec. 1, 1987, which is hereby incorporated by reference in its entirety.

The method and apparatus of FIG. 1 may be advantageously used to produce multilayer preforms with crystallized neck finishes for a variety of applications, including refillable, pasteurizable, and hot-fillable containers. A number of specific embodiments are described below.

Hot-Fill Preform/Container Embodiment

A first preform/container embodiment is illustrated in FIGS. 2–4. FIG. 2 shows a multilayer preform 30 made from the method and apparatus of FIG. 1. FIGS. 3–4 show a hot-fill beverage bottle 70 made from the preform of FIG. 2, including a cross-section of the multilayer sidewall.

Figure 2A:
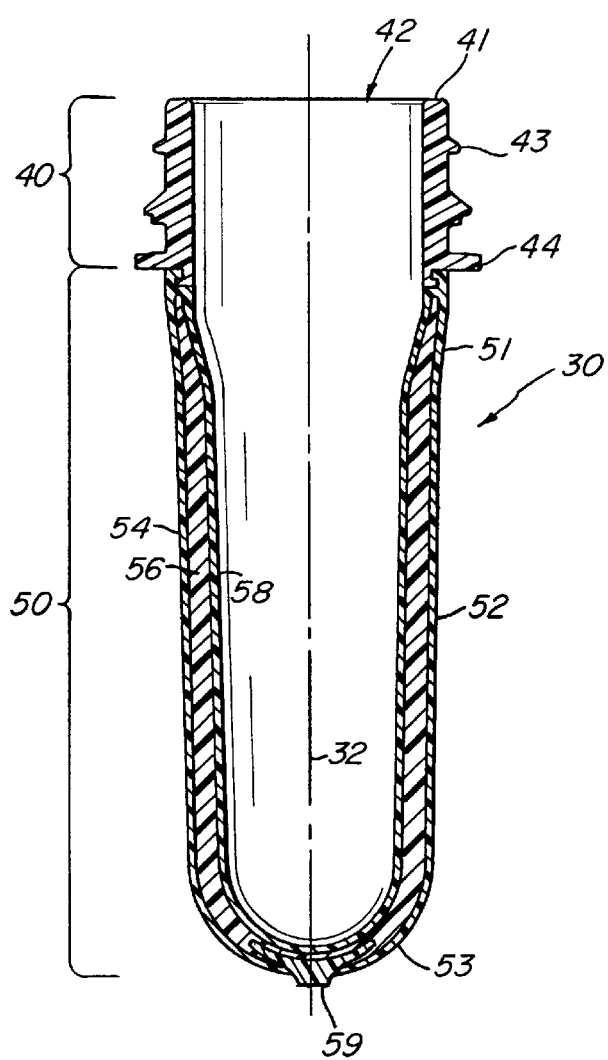
FIG. 2A is a cross-section of a first preform embodiment made according to the present invention.

FIG. 2A shows a substantially cylindrical preform 30 (defined by vertical centerline 32) which includes an upper neck portion or finish 40 integral with a lower body-forming portion 50. The crystallized neck portion is a monolayer of CPET and includes an upper sealing surface 41 which defines the open top end 42 of the preform, and an exterior surface having threads 43 and a lowermost flange 44. CPET, sold by Eastman Chemical, Kingsport, TN, is a polyethylene terephthalate polymer with nucleating agents which cause the polymer to crystallize during the injection molding process. Below the neck finish 40 is a body-forming portion 50 which includes a flared shoulder-forming section 51, increasing (radially inwardly) in wall thickness from top to bottom, a cylindrical panel-forming section 52 having a substantially uniform wall thickness, and a base-forming section 53. Body-forming section 50 is substantially amorphous and is made of the following three layers in serial order: outer layer 54 of virgin PET; core layer 56 of post-consumer PET; and inner layer 58 of virgin PET. The virgin PET is a low copolymer having 3% comonomers (e.g., cyclohexane dimethanol (CHDM) or isophthalic acid (IPA)) by total weight of the copolymer. A last shot of virgin PET (to clean the nozzle) forms a core layer 59 in the base.

This particular preform is designed for making a hot-fill beverage container. In this embodiment, the preform has a height of about 96.3 mm, and an outer diameter in the panel-forming section 52 of about 26.7 mm. The total wall thickness at the panel-forming section 52 is about 4 mm, and the thicknesses of the various layers are: outer layer 54 of about 1 mm, core layer 56 of about 2 mm, and inner layer 58 of about 1 mm. The panel-forming section 52 may be stretched at an average planar stretch ratio of about 10:1, as described hereinafter. The planar stretch ratio is the ratio of the average thickness of the preform panel-forming portion 52 to the average thickness of the container panel 83, wherein the "average" is taken along the length of the respective preform or container portion. For hot-fill beverage bottles of about 0.5 to 2.0 liters in volume and about 0.35 to 0.60 millimeters in panel wall thickness, a preferred planar stretch ratio is about 9 to 12, and more preferably about 10 to 11. The hoop stretch is preferably about 3.3 to 3.8 and the axial stretch about 2.8 to 3.2. This produces a container panel with the desired abuse resistance, and a preform sidewall with the desired visual transparency. The specific panel thickness and stretch ratio selected depend on the dimensions of the bottle, the internal pressure, and the processing characteristics (as determined for example, by the intrinsic viscosity of the particular materials employed).

In order to enhance the crystallinity of the neck portion, a high injection mold temperature is used at the first molding station. In this embodiment, CPET resin is injection molded at a temperature of about 105 to 160° C. (mold temperature). The first core set, carrying the still warm neck portions, are then transferred to the second station where multiple second polymers are injected to form the multilayer body-forming portions and melt bonding occurs between the neck and body-forming portions. The core and/or cavity set at the second station are cooled (e.g., 5 to 15° C. core/cavity temperature) in order to solidify the preforms and enable removal from the molds with acceptable levels of post-mold shrinkage. The cores and cavities at both the first and second stations include water cooling/heating passages for adjusting the temperature as desired. By bonding (between the neck and body-forming portions) it is meant any type of bonding, such as diffusion, chemical, chain entanglement, hydrogen bonding, etc.

Figure 2B:
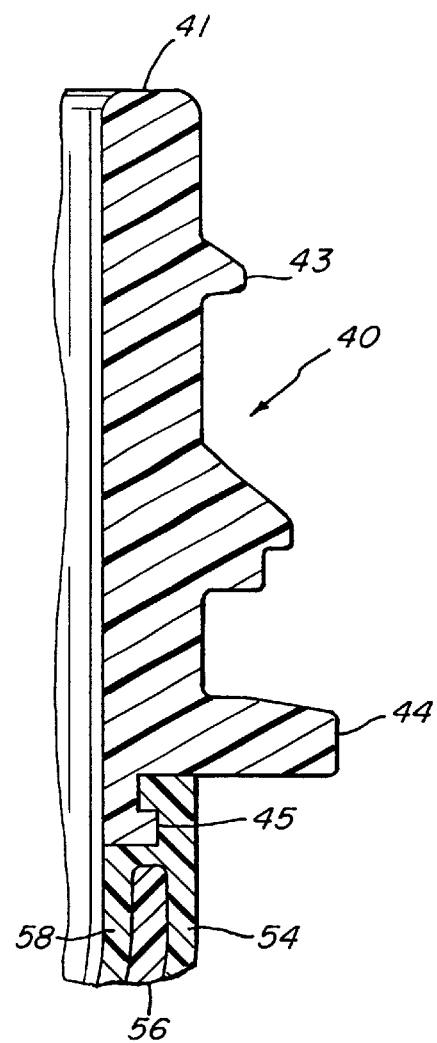
FIG. 2B is an enlarged fragmentary cross-section of the neck finish of the preform in FIG. 2A.

FIG. 2B is an enlarged view of the neck finish 40 of preform 30. The monolayer CPET neck finish is formed with a projection 45 at its lower end, which is later surrounded (interlocked) by the virgin PET melt from the inner and outer layers 54, 58 at the second molding station. The CPET neck finish and outermost virgin PET layers of the body are melt bonded together.

FIG. 3 shows a unitary expanded plastic preform container 70, made from the preform of FIG. 2. The container is about 182.0 mm in height and about 71.4 mm in (widest) diameter. This 16-oz. container is intended for use as a hot-fill non-carbonated juice container. The container has an open top end with the same crystallized neck finish 40 as the preform, with external screw threads 43 for receiving a screw-on cap (not shown). Below the neck finish 40 is a substantially amorphous and transparent expanded body portion 80. The body includes a substantially vertically-disposed sidewall 81 (defined by vertical centerline 72 of the bottle) and base 86. The sidewall includes an upper flared shoulder portion 82 increasing in diameter to a substantially cylindrical panel portion 83. The panel 83 has a plurality of vertically-elongated, symmetrically-disposed vacuum panels 85. The vacuum panels move inwardly to alleviate the vacuum formed during product cooling in the sealed container, and thus prevent permanent, uncontrolled deformation of the container. The base 86 is a champagne-style base having a recessed central gate portion 87 and moving radially outwardly toward the sidewall, an outwardly concave dome 88, an inwardly concave chime 89, and a radially increasing and arcuate outer base portion 90 for a smooth transition to the sidewall 81. The chime 89 is a substantially toroidal-shaped area around a standing ring on which the bottle rests.

The multilayer sidewall of bottle 70 is not specifically illustrated in FIG. 3 due to the small scale of the drawing. However, FIG. 4 shows in cross section the multilayer panel portion 83 including an outer layer 92, a core layer 94, and an inner layer 96, corresponding to the outer 54, core 56 and inner 58 layers of the preform. The inner and outer container layers (of virgin PET copolymer) 92, 96 are each about 0.1 mm thick, and the core layer 94 (of post-consumer PET) is about 0.2 mm thick. The shoulder 82 and base 86 are stretched less and therefore are thicker and less oriented than the panel 83.

Second Method Embodiment (Shuttle)

FIGS. 5A–5D illustrate an alternative apparatus utilizing a reciprocating shuttle as opposed to the rotary indexer of the first embodiment. Two core sets are mounted on a shuttle which is movable between three cavity sets as described below.

Th e apparatus includes first and second parallel guide bars 202, 203 on which a platen 205 is movably mounted in the direction of arrow $A_4$, The platen 205 carries a platform or shuttle 206 which is movable in a transverse direction across the platen 205 as shown by arrow $A_5$. A fixed platen 212 at one end of the guide bars holds three injection mold cavity sets 213, 214 and 215, which are supplied by nozzles 218, 219 and 220 respectively. The left and right cavity sets 213 and 215 are used to form neck portions of preforms, while the middle cavity set 214 is used for molding body-forming portions.

Figure 5A:
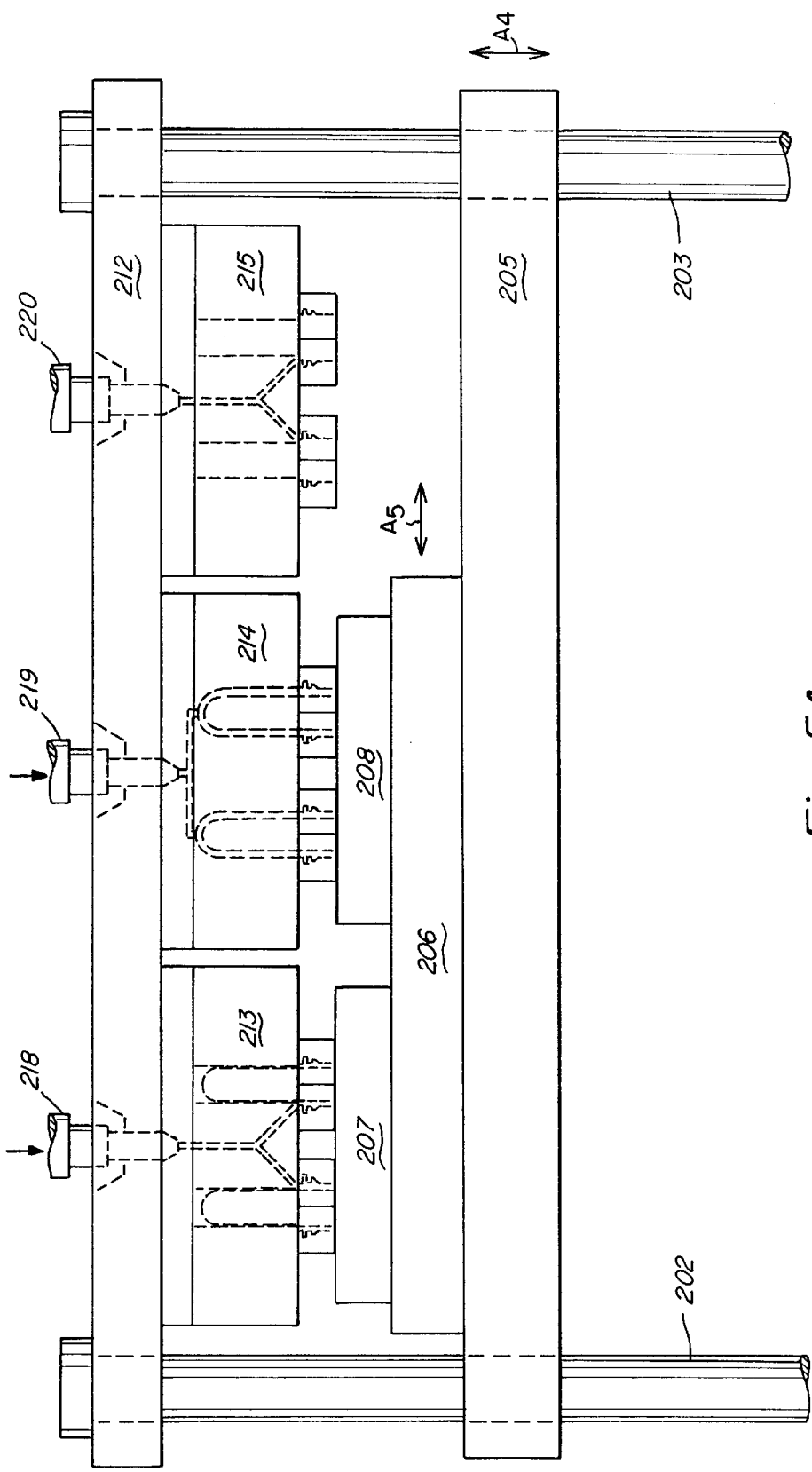
FIGS. 5A–5D show sequential steps of a second method embodiment utilizing a reciprocating shuttle.
Figure 5B:
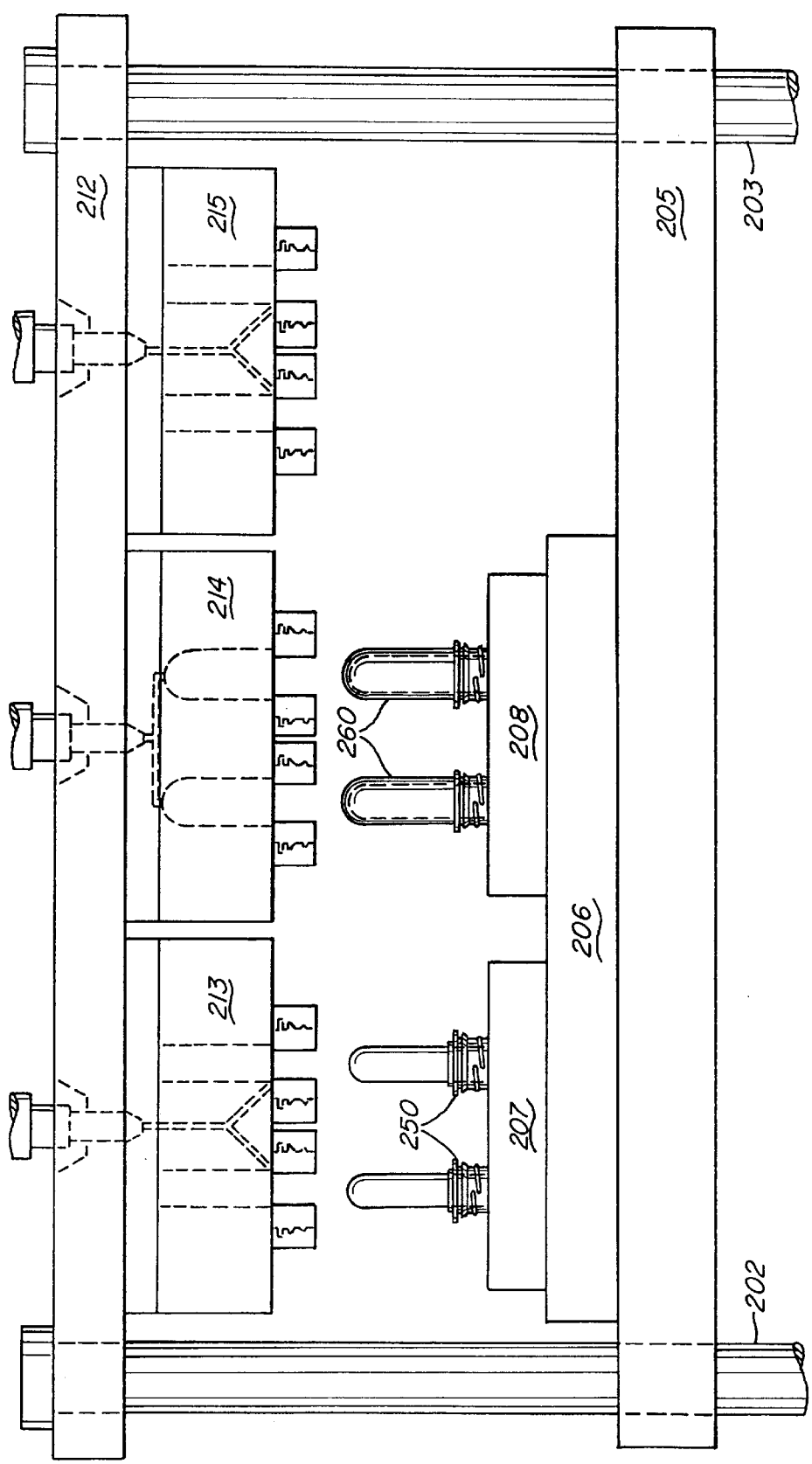
Figure 5C:
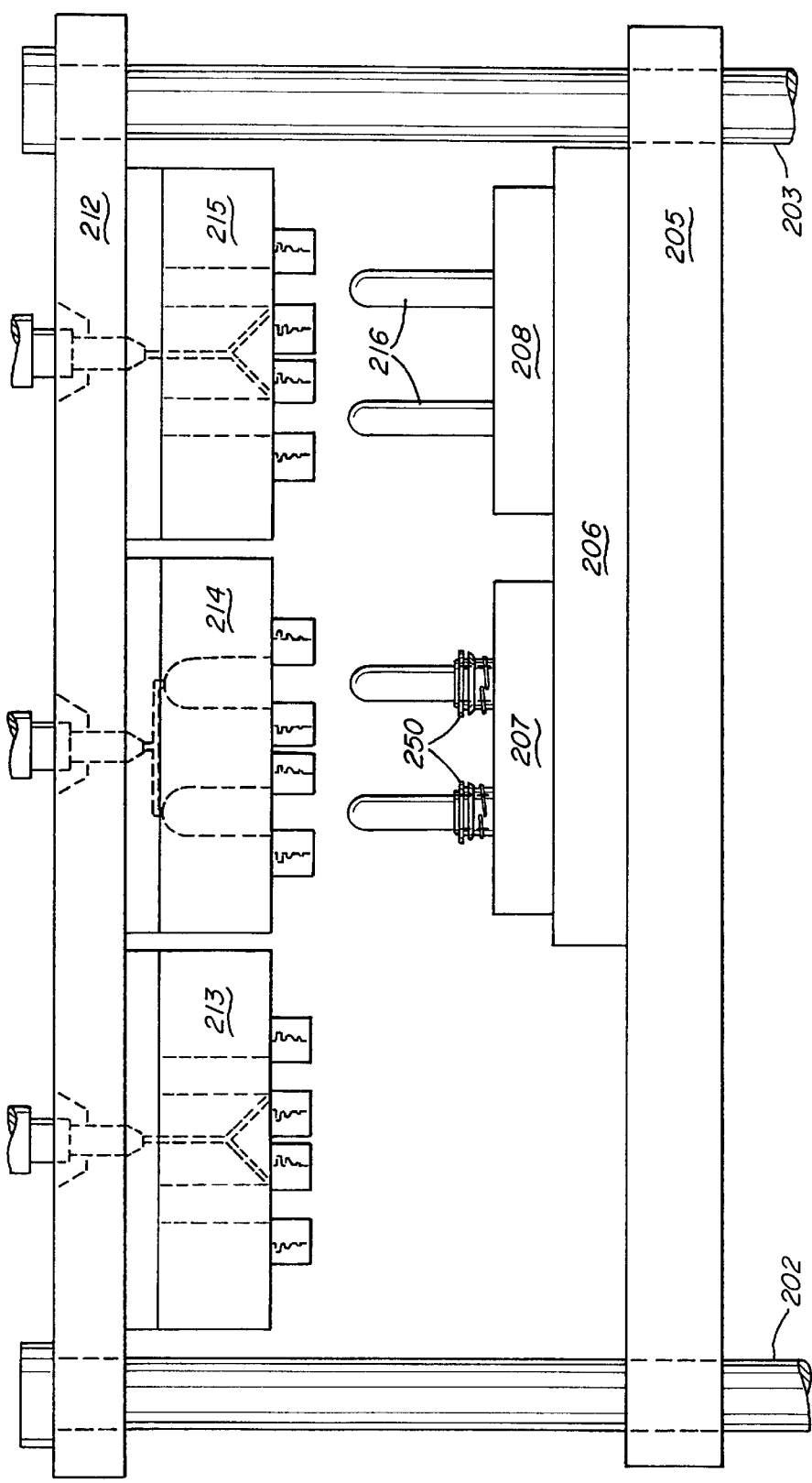

FIG. 5A shows an arbitrarily-designated first step wherein the first core set 207 is positioned in left cavity set 213 for forming a set of preform neck portions. Simultaneously, second core set 208 is positioned in middle cavity set 214 for molding a set of multilayer body-forming portions (adjacent previously molded neck portions). FIG. 5B shows the core sets following removal from the cavity sets, with a neck portion 250 on each core of core set 207, and a complete preform 260 on each core of core set 208. The completed preforms 260 are then ejected from the core set 208.

Figure 5D:
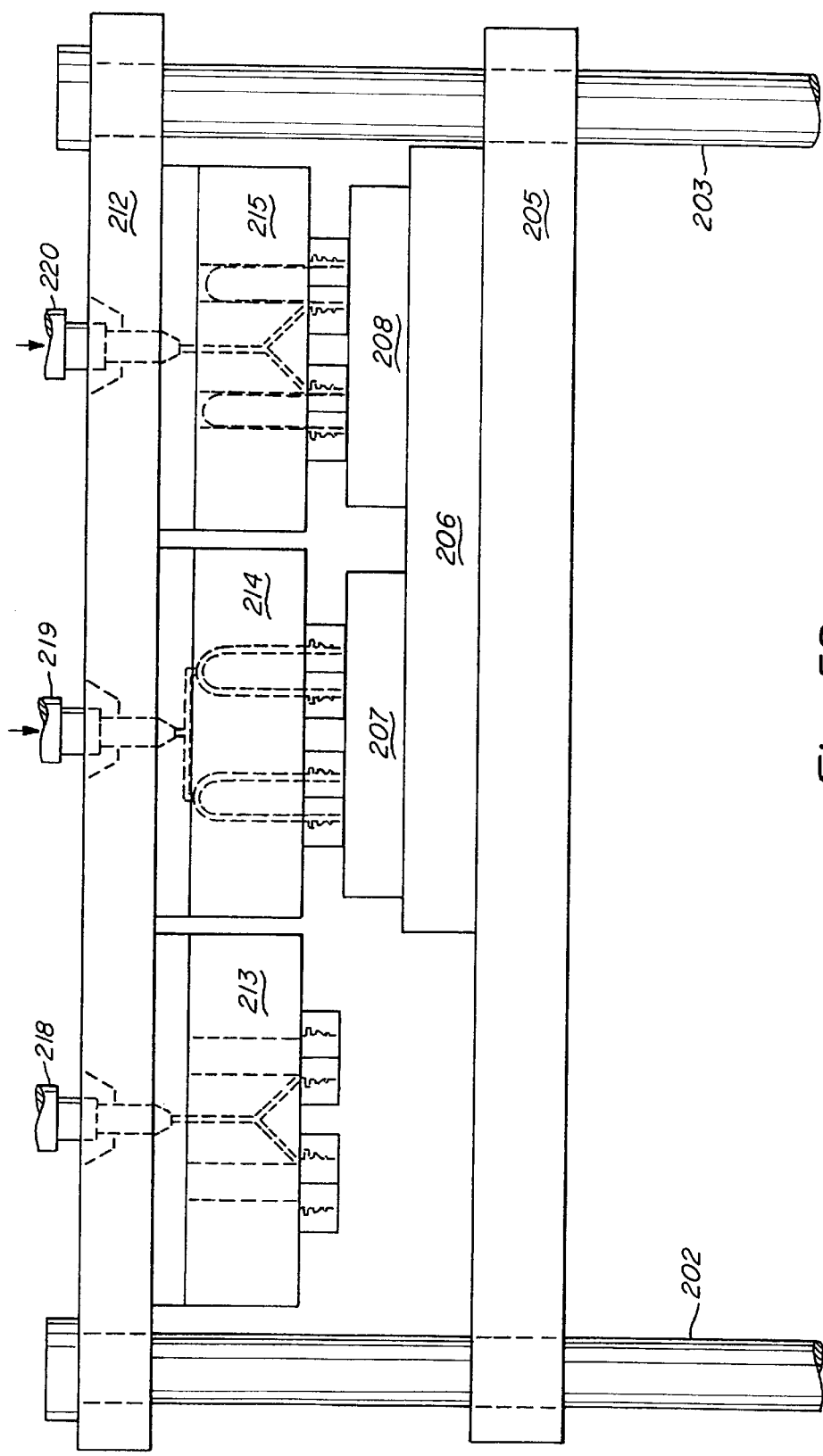

In a second step (FIG. 5C), the shuttle 206 is moved to the right such that first core set 207 with neck portions 250 is now positioned adjacent middle cavity 214, while second core set 208 with now empty cores 216 is positioned adjacent right cavity set 215. Movable platen 205 is then moved towards fixed platen 212 so as to position first core set 207 in middle cavity set 214 and second core set 208 in right cavity set 215 (FIG. 5D). Again, body-forming portions are formed adjacent the previously-formed neck portions in middle cavity set 214, while neck portions are molded over each of the cores in the core set 208 in right cavity 215. The movable platen 205 is then reversed to remove the core sets from the cavity sets, the finished preforms on the first core set 207 are ejected, and the shuttle 206 returned to the left for molding the next set of layers.

Alternative Constructions

There are numerous preform and container constructions possible, each of which may be adapted for a particular food product and/or package, filling, and manufacturing process. A few representative examples will be given.

The neck portion can be monolayer or multilayer and made of various polymers other than CPET, such as arylate polymers, polyethylene naphthalate (PEN), polycarbonates, polypropylene, polyimides, polysulfones, acrylonitrile styrene, etc. As a further alternative, the neck portion can be made of a regular bottle-grade homopolymer or low copolymer PET (i.e., having a low crystallization rate), but the temperature or other conditions of the first molding station can be adjusted to crystallize the neck portion.

The body-forming portion can be monolayer or multilayer and made of various polymers including polyesters, polyamides and polycarbonates. Suitable polyesters include homopolymers, copolymers or blends of polyethylene terephthalate (PET), polybutylene terephthalate (PBT), polypropylene terephthalate (PPT), polyethylene napthalate (PEN), and a cyclohexane dimethanol/PET copolymer, known as PETG (available from Eastman Chemical, Kingsport, Tenn). Suitable polyamides (PA) include PA6, PA6,6, PA6,4, PA6,10, PA11, PA12, etc. Other options include acrylic/imide, amorphous nylon, polyacrylonitrile (PAN), polystyrene, crystallizable nylon (MXD-6), polyethylene (PE), polypropylene (PP), and polyvinyl chloride (PVC).

Polyesters based on terephthalic or isophthalic acid are commercially available and convenient. The hydroxy compounds are typically ethylene glycol and 1,4-di-(hydroxy methyl)-cyclohexane. The intrinsic viscosity for phthalate polyesters are typically in the range of 0.6 to 1.2, and more particularly 0.7 to 1.0 (for O-chlorolphenol solvent). 0.6 corresponds approximately to a viscosity average molecular weight of 59,000, and 1.2 to a viscosity average molecular weight of 112,000. In general, the phthalate polyester may include polymer linkages, side chains, and end groups not related to the formal precursors of a simple phthalate polyester previously specified. Conveniently, at least 90 mole percent will be terephthalic acid and at least 90 mole percent an aliphatic glycol or glycols, especially ethylene glycol.

Post-consumer PET (PC-PET) is prepared from PET plastic containers and other recyclables that are returned by consumers for a recycling operation, and has now been approved by the FDA for use in certain food containers. PC-PET is known to have a certain level of I.V. (intrinsic viscosity), moisture content, and contaminants. For example, typical PC-PET (having a flake size of one-half inch maximum), has an I.V. average of about 0.66 dl/g, a relative humidity of less than 0.25%, and the following levels of contaminants:

PVC:<100 ppm aluminum:<50 ppm olefin polymers (HDPE, LDPE, PP):<500 ppm paper and labels:<250 ppm colored PET:<2000 ppm other contaminants:<500 ppm PC-PET may be used alone or in one or more layers for reducing the cost or for other benefits.

Also useful as a base polymer or as a high-oxygen barrier layer is a packaging material with physical properties similar to PET, namely polyethylene naphthalate (PEN). PEN provides a 3–5× improvement in barrier property and enhanced thermal resistance, at some additional expense. Polyethylene naphthalate (PEN) is a polyester produced when dimethyl 2,6-naphthalene dicarboxylate (NDC) is reacted with ethylene glycol. The PEN polymer comprises repeating units of ethylene 2,6 naphthalate. PEN resin is available having an inherent viscosity of 0.67 dl/g and a molecular weight of about 20,000 from Amoco Chemical Company, Chicago, Ill. PEN has a glass transition temperature $T_g$ of about 123° C., and a melting temperature $T_m$ of about 267° C.

Oxygen barrier layers include ethylene/vinyl alcohol (EVOH), PEN, polyvinyl alcohol (PVOH), polyvinyldene chloride (PVDC), nylon 6, crystallizable nylon (MXD-6), LCP (liquid crystal polymer), amorphous nylon, polyacrylonitrile (PAN) and styrene acrylonitrile (SAN).

The intrinsic viscosity (I.V.) effects the processability of the resins. Polyethylene terephthalate having an intrinsic viscosity of about 0.8 is widely used in the carbonated soft drink (CSD) industry. Polyester resins for various applications may range from about 0.55 to about 1.04, and more particularly from about 0.65 to 0.85 dl/g. Intrinsic viscosity measurements of polyester resins are made according to the procedure of ASTM D-2857, by employing 0.0050±0.0002 g/ml of the polymer in a solvent comprising o-chlorophenol (melting point 0° C.), respectively, at 30° C. Intrinsic viscosity (I.V.) is given by the following formula:

$$I.V. = (\ln(V_{Soln.}/V_{sol.}))/C$$

where:

$V_{Soln.}$ is the viscosity of the solution in any units;

$V_{sol}$ is the viscosity of the solvent in the same units; and

C is the concentration in grams of polymer per 100 mls of solution.

The blown container body should be substantially transparent. One measure of transparency is the percent haze for transmitted light through the wall (HT) which is given by the following formula:

$$HT = [Y d_d \div (Y_d + Y_s)] \times 100$$

where $Y_d$ is the diffuse light transmitted by the specimen, and $Y_s$ is the specular light transmitted by the specimen. The diffuse and specular light transmission values are measured in accordance with ASTM Method D 1003, using any standard color difference meter such as model D25D3P manufactured by Hunterlab, Inc. The container body should have a percent haze (through the panel wall) of less than about 10%, and more preferably less than about 5%.

The preform body-forming portion should also be substantially amorphous and transparent, having a percent haze across the wall of no more than about 10%, and more preferably no more than about 5%.

The container will have varying levels of crystallinity at various positions along the height of the bottle from the neck finish to the base. The percent crystallinity may be determined according to ASTM 1505 as follows:

$$\% \text{ crystallinity} = [(ds - da)/(dc - da)] \times 100$$

where ds=sample density in g/cm, da=density of an amorphous film of zero percent crystallinity, and dc=density of the crystal calculated from unit cell parameters. The panel portion of the container is stretched the greatest and preferably has an average percent crystallinity in at least the outer layer of at least about 15%, and more preferably at least about 20%. For primarily PET polymers, a 15–25% crystallinity range is useful in refill and hot-fill applications.

Further increases in crystallinity can be achieved by heat setting to provide a combination of strain-induced and thermal-induced crystallization. Thermal-induced crystallinity is achieved at low temperatures to preserve transparency, e.g., holding the container in contact with a low temperature blow mold. In some applications, a high level of crystallinity at the surface of the sidewall alone is sufficient.

As a further alternative embodiment, the preform may include one or more layers of an oxygen scavenging material. Suitable oxygen scavenging materials are described in U.S. Ser. No. 08/355,703 filed Dec. 14, 1994 by Collette et al., entitled "Oxygen Scavenging Composition For Multilayer Preform And Container," which is hereby incorporated by reference in its entirety. As disclosed therein, the oxygen scavenger may be a metal-catalyzed oxidizable organic polymer, such as a polyamide, or an anti-oxidant such as phosphite or phenolic. The oxygen scavenger may be mixed with PC-PET to accelerate activation of the scavenger. The oxygen scavenger may be advantageously combined with other thermoplastic polymers to provide the desired injection molding and stretch blow molding characteristics for making substantially amorphous injection molded preforms and substantially transparent biaxially oriented polyester containers. The oxygen scavenger may be provided as an interior layer to retard migration of the oxygen scavenger or its byproducts, and to prevent premature activation of the scavenger.

Refillable containers must fulfill several key performance criteria in order to achieve commercial viability, including:
1. high clarity (transparency) to permit visual on-line inspection;
2. dimensional stability over the life of the container; and
3. resistance to caustic wash induced stress cracking and leakage.

Generally, a refillable plastic bottle must maintain its functional and aesthetic characteristics over a minimum of 10 and preferably 20 cycles or loops to be economically feasible. A cycle is generally comprised of (1) an empty hot caustic wash, (2) contaminant inspection (before and/or after wash) and product filling/capping, (3) warehouse storage, (4) distribution to wholesale and retail locations and (5) purchase, use and empty storage by the consumer, followed by eventual return to the bottler.

A test procedure for simulating such a cycle would be as follows. As used in this specification and claims, the ability to withstand a designated number of refill cycles without crack failure and/or with a maximum volume change is determined according to the following test procedure.

Each container is subjected to a typical commercial caustic wash solution prepared with 3.5% sodium hydroxide by weight and tap water. The wash solution is maintained at a designated wash temperature, e.g., 60° C. The bottles are submerged uncapped in the wash for 15 minutes to simulate the time/temperature conditions of a commercial bottle wash system. After removal from the wash solution, the bottles are rinsed in tap water and then filled with a carbonated water solution at 4.0±0.2 atmospheres (to simulate the pressure in a carbonated soft drink container), capped and placed in a 38° C. convection oven at 50% relative humidity for 24 hours. This elevated oven temperature is selected to simulate longer commercial storage periods at lower ambient temperatures. Upon removal from the oven, the containers are emptied and again subjected to the same refill cycle, until failure.

A failure is defined as any crack propagating through the bottle wall which results in leakage and pressure loss. Volume change is determined by comparing the volume of liquid the container will hold at room temperature, both before and after each refill cycle.

A refillable container can preferably withstand at least 20 refill cycles at a wash temperature of 60° C. without failure, and with no more than 1.5% volume change after 20 cycles.

In this invention, a higher level of crystallization can be achieved in the neck finish compared to prior art processes which crystallize outside the mold. Thus, the preform neck finish may have a level of crystallinity of at least about 30%. As a further example, a neck finish made of a PET homopolymer can be molded with an average percent crystallinity of at least about 35%, and more preferably at least about 40% To facilitate bonding between the neck portion and body-forming portion of the preform, one may use a thread split cavity, wherein the thread section of the mold is at a temperature above 60° C., and preferably above 75° C.

As an additional benefit, a colored neck finish can be produced, while maintaining a transparent container body.

Other benefits include the achievement of higher hot-fill temperatures (i.e., above 85° C.) because of the increased thermal resistance of the finish, and higher refill wash temperatures (i.e., above 60° C.). The increased thermal resistance is also particularly useful in pasteurizable containers.

While there have been shown and described several embodiments of the present invention, it will be obvious to those skilled in the art that various changes and modifications may be made therein without departing from the scope of the invention as defined by the appending claims.

What is claimed is:

1. A method of making a preform by molding, the molding steps comprising:
   introducing at least one first thermoplastic material into a first mold to form during a first molding step while under first molding conditions a substantially crystallized and opaque first portion of a preform, the first portion being substantially a neck finish of the preform, the first molding conditions including a first melt temperature and a first mold temperature selected to achieve the substantially crystallized and opaque first portion;
   transferring the first portion of the preform to a second mold; and
   introducing at least one second thermoplastic material into the second mold to form by a second molding step while under second molding conditions different from the first molding conditions a substantially amorphous and transparent second portion of the preform, the second portion being substantially a body-forming portion of the preform, the second material having a relatively low crystallization rate compared to the first material, and the second molding conditions including a second melt temperature and a second mold temperature selected to achieve the substantially amorphous and transparent second portion, the second molding conditions further allowing maintenance of compressive forces to bond the first and second portions;
   wherein during the first molding step a first molding core is positioned in the first mold for forming the first preform portion on the first core, and during the second molding step the first core and first preform portion are transferred to the second mold for forming the second preform portion over the first core; and
   cooling the second mold to enable solidification and removal of the first and second preform portions from the molds.

2. The method of claim 1, wherein the first mold is at a higher temperature than the second mold.

3. The method of claim 1, wherein during the first molding step a second core with a first preform portion is positioned in the second mold for simultaneously molding a second preform portion on the second core.

4. The method of claim 1, wherein during the first molding step a plurality of first preform portions are molded on a plurality of first cores in a plurality of first molds, and during the second molding step a plurality of second preform portions are molded on the plurality of first cores in a plurality of second molds.

5. The method of claim 4, wherein during the first molding step a plurality of second cores with first preform portions are positioned in the second molds for simultaneously molding a plurality of second preform portions on the second cores.

6. The method of claim 1, wherein a flow-adjusting element is provided in at least one of the first and second molds to increase the flow rate of the second material adjacent the first material.

7. The method of claim 1, wherein the second material comprises a predetermined polymer composition and the first material comprises the predetermined polymer composition with nucleating agents to increase the crystallization rate.

8. The method of claim 7, wherein the predetermined polymer composition is a polyester composition.

9. The method of claim 8, wherein the polyester composition is substantially polyethylene terephthalate (PET).

10. The method of claim 1, wherein the first material is selected from the group consisting of polyester, polyester with nucleating agents, arylate polymers, polyethylene naphthalate (PEN), polycarbonate, polypropylene, polyimide, polysulfone, and acrylonitrile styrene.

11. The method of claim 1, wherein the second material is selected from the group consisting of homopolymers, copolymers or blends of any one or more of: polyethylene terephthalate (PET), polyethylene naphthalate (PEN), and post-consumer PET.

12. The method of claim 1, further comprising introducing a nonthermoplastic material into at least one of the first and second molds to form a nonthermoplastic layer in at least one of the first and second preform portions.

13. The method of claim 1, further comprising expanding the body-forming portion to form a container having a substantially transparent body portion and the crystallized neck portion.

14. The method of claim 1, wherein one or more differences in temperature and pressure are used in the first and second molds to obtain the different molding conditions in the first and second molds.

15. The method of claim 1, wherein the second molding step includes maintaining compressive forces to form a composite preform from the first and second portions.

16. The method of claim 15, wherein differences in pressure are used in the first and second molds to obtain the different molding conditions in the first and second molds.

17. The method of claim 1, wherein the average percent crystallinity of the first preform portion in the first mold is at least 30%.

18. The method of claim 16, wherein the average percent crystallinity of the first preform portion is at least 35%.

19. The method of claim 17, wherein the average percent crystallinity of the first preform portion is at least 40%.

20. The method of claim 1, wherein the first portion is still warm when transferred on the core to the second mold.

21. The method of claim 1, wherein the first and second portions are bonded by any one of melt, diffusion, chemical, chain entanglement and hydrogen bonding.

22. The method of claim 21, wherein the bonding is melt bonding.

23. The method of claim 1, wherein the first material is substantially polyester.

24. The method of claim 23, wherein the second material is substantially polyester.

25. The method of claim 23, wherein the first portion is substantially a monolayer of PET with nucleating agents.

26. The method of claim 25, wherein the second portion is a multilayer including one or more layers of PET.

27. A method of making a preform by molding, the molding steps comprising:

introducing at least one first thermoplastic material into a first mold to form during a first molding step while under first molding conditions a substantially crystallized and opaque first portion of a preform, the first portion being substantially a neck finish of the preform, the first molding conditions including a first melt temperature and a first mold temperature, the first melt temperature being selected to achieve crystallization of the first thermoplastic material in the first mold, and the first mold temperature being selected to achieve the substantially crystallized and opaque first portion;

transferring the first portion of the preform to a second mold; and introducing at least one second thermoplastic material into the second mold to form by a second molding step while under second molding conditions different from the first molding conditions a substantially amorphous and transparent second portion of the preform, the second portion being substantially a body-forming portion of the preform, the second material having a relatively low crystallization rate compared to the first material, and the second molding conditions including a second melt temperature and a second mold temperature selected to achieve the substantially amorphous and transparent second portion, the second molding conditions further allowing maintenance of compressive forces to bond the first and second portions; and wherein during the first molding step a first molding core is positioned in the first mold for forming the first preform portion on the first core, and during the second molding step the first core and first preform portion are transferred to the second mold for forming the second preform portion over the first core.

* * * * *